United States Patent Office

2,922,699
Patented Jan. 26, 1960

---

2,922,699

PRODUCTION OF BORON NITRIDE

Wilbur R. Lauzau, Fostoria, Ohio, assignor to Union Carbide Corporation, a corporation of New York No Drawing. Application December 11, 1957
Serial No. 701,953

5 Claims. (Cl. 23—191)

This invention relates to the production of boron nitride.

Boron nitride is a material of increasing interest to industry. Several processes for preparing it are known but none has proved entirely satisfactory for use in large-scale production. Thus, some processes can only be practiced in batch-type operations. Others must be carried out at very high temperatures, while still others utilize costly or hazardous materials. In most known processes, the yield of product is poor. Perhaps the most important single disadvantage of existing processes is that the product produced does not have desired purity.

It is the principal object of this invention to provide a method for the production of boron nitride, which method is free of the disadvantages of prior processes. A more specific object of the invention is a process for the production of boron nitride at relatively low temperature.

These objects are achieved by the invention which comprises a process for the production of boron nitride in which dicyandiamide is caused to react with boric acid or boric acid anhydride in the absence of oxygen and in the presence of ammonium chloride. As used hereinafter, the term "boric acid" is intended to include its anhydride.

In accordance with the invention dicyandiamide in finely-divided form is mixed with ammonium chloride and the mixture is heated to its melting point. To the melt so produced boric acid in powder form is added. The boric acid is dissolved in the melt, and the clear melt is heated at boiling temperatures. A considerable evolution of gas occurs throughout heating, aiding in the exclusion of air from the vessel. Upon continued heating suitably in an atmosphere of nitrogen, the melt is eventually converted to a porous, white solid. The solid material so produced is finely divided and heated to a high temperature sufficient to remove substantially all volatile matter. The infusible, white powder thus produced is boron nitride.

In a specific instance embodying the process of the invention, dicyandiamide and ammonium chloride were mixed in the molar ratio of one mole dicyandiamide to two moles of ammonium chloride. The mixture was heated to produce a low viscosity melt. Boric acid powder was added to the melt in a proportion of two moles boric acid to one mole of dicyandiamide. Upon boiling the liquid melt, a white solid was produced, which when heated to about 1600° C., produced a white powder identified by X-ray methods as boron nitride. The yield of boron nitride was 65% of the theoretical.

It is believed that in the process of the invention, the following reaction, resulting in the production of guanidine hydrochloride, takes place:

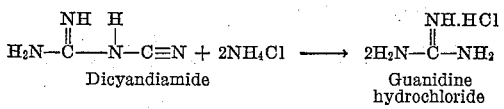

The guanidine hydrochloride then is believed to be decomposed by reaction with boric acid to produce boron nitride.

In the process of the invention ammonium chloride is essential. If none is used, extreme frothing and expansion of the reaction products occurs. Generally, it is believed that about two moles of ammonium chloride for each mole of dicyandiamide are required to produce the desired result. Little added benefit is obtained by using proportions substantially in excess of this 2 to 1 ratio. The proportion of boric acid to dicyandiamide in the process of the invention should be in the range 2 to 4 moles of boric acid to 1 mole of dicyandiamide. An excess of boric acid tends to suppress undesirable presence of carbon in the product.

The process of the invention is advantageous in that it is conducted at relatively low temperatures. For example, the melt may be produced at temperatures as low as about 300° C. During decomposition the temperature rises somewhat, but does not substantially exceed 1000° C. In addition to the process advantages deriving from low temperature operation, the process of the invention is advantageous in that boron nitride produced at low temperatures is more amenable to hot pressing than boron nitride produced at high temperatures.

I claim:

1. A process for the production of boron nitride, which process comprises reacting dicyandiamide with boric acid in the presence of a sufficient amount of ammonium chloride to substantially inhibit frothing, and in the absence of oxygen said boric acid and said dicyandiamide being present in a molar ratio of not less than two moles of boric acid per mole of dicyandiamide, and heating the reaction product to a temperature sufficient to remove substantially all volatile matter therefrom.

2. A process for the production of boron nitride, which process comprises melting together dicyandiamide and a sufficient amount of ammonium chloride to substantially inhibit frothing; adding boric acid to the melt so produced said boric acid and said dicyandiamide being present in said melt in a molar ratio of not less than two moles of boric acid per mole of dicyandiamide; boiling the melt in the absence of oxygen and continuing heating until substantial evolution of gas ceases.

3. A process as defined in claim 2 in which said dicyandiamide and said ammonium chloride are present in a molar ratio of substantially two moles of ammonium chloride per mole of dicyandiamide.

4. A process as defined in claim 3 wherein boric acid is added to said melt in a molar ratio of about 2 to 4 moles of boric acid per mole of dicyandiamide.

5. A process as defined in claim 4 wherein said melt is boiled in an atmosphere of nitrogen.

References Cited in the file of this patent

"Comprehensive Treatise on Inorganic and Theoretical Chemistry," Mellor, vol. 8, page 109, lines 12 to 15 and third paragraph, line 6.